United States Patent [19]

Bhattacharyya et al.

[11] Patent Number: 5,614,163
[45] Date of Patent: Mar. 25, 1997

[54] CATALYZED VAPOR PHASE PROCESS FOR MAKING SYNTHESIS GAS

[75] Inventors: Alakananda Bhattacharyya, Wheaton; Mark S. Kleefisch, Naperville; Carl A. Udovich, Joliet, all of Ill.

[73] Assignee: Amoco Corporation, Chicago, Ill.

[21] Appl. No.: 507,568

[22] Filed: Jul. 26, 1995

Related U.S. Application Data

[60] Division of Ser. No. 48,667, Apr. 16, 1993, Pat. No. 5,439,861, which is a continuation-in-part of Ser. No. 745,902, Aug. 16, 1991, Pat. No. 5,246,899, and Ser. No. 993,419, Dec. 21, 1992, abandoned.

[51] Int. Cl.$^6$ ................................................ C01B 31/18
[52] U.S. Cl. ...................... 423/418.2; 423/648.1; 423/650; 423/651
[58] Field of Search .................. 423/415.1, 418.2, 423/648.1, 650, 651

[56] References Cited

U.S. PATENT DOCUMENTS 3,865,753  2/1975  Broecker et al. ............... 502/328

FOREIGN PATENT DOCUMENTS 1509557  5/1978  United Kingdom.
2085314  4/1982  United Kingdom.

*Primary Examiner*—Steven Bos
*Assistant Examiner*—Thomas G. Dunn, Jr.
*Attorney, Agent, or Firm*—Thomas A. Yassen; Frederick S. Jerome; Robert E. Sloat

[57] ABSTRACT

A process is disclosed for preparing a synthesis gas comprising hydrogen and carbon monoxide by partial oxidation of hydrocarbyl compounds using a source of oxygen comprising molecular oxygen, carbon dioxide, or mixtures thereof in the presence of a catalyst comprising thermally stable mixtures formed by heat treating a hydrotalcite-like compound.

17 Claims, No Drawings

5,614,163

1
CATALYZED VAPOR PHASE PROCESS FOR MAKING SYNTHESIS GAS

CROSS-REFERENCE TO RELATED APPLICATION

This is a divisional of application Ser. No. 08/048,667, filed Apr. 16, 1993 now U. S. Pat. No. 5,439,861, which is a continuation-in-part of application Ser. No. 07/745,902 filed Aug. 16, 1991 now U. S. Pat. No. 5,246,899 and application Ser. No. 07/993,419. filed Dec. 21, 1992, now abandoned, the specifications and claims of which are incorporated by reference herein.

BACKGROUND OF THE INVENTION

This invention relates to preparing synthesis gas by reacting a hydrocarbyl feed material with a source of oxygen at elevated temperatures. More particularly, this invention relates to a catalyzed vapor phase process for making synthesis gas using catalytic materials obtained from precursor metal hydroxide compounds having a hydrotalcite-like structure. Such catalytic materials are unusually resistant to deactivation and particularly resistant to coke formation in the process of this invention. Additionally, this invention relates to preparation of hydrotalcite-type clays which are precursors of catalyst compositions that are useful for production of synthesis gas when used to catalyze reaction of a hydrocarbyl compound with an oxygen-containing gas at elevated temperatures to form synthesis gas.

Synthesis gas, a mixture of carbon monoxide (CO) and molecular hydrogen ($H_2$), is a valuable industrial feed stock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons.

Perhaps the most common commercial source of synthesis gas is the steam reforming of coal or a hydrocarbon, particularly natural gas. In the steam reforming process, a mixture of water and the hydrocarbon are contacted at a high temperature, for example, in the range of about 850° C. to about 900° C., and typically in the presence of a catalyst, to form a mixture of hydrogen and carbon monoxide. Using methane as the hydrocarbon, the stoichiometry for the steam reforming reaction is as follows:

$$CH_4 + H_2O \rightarrow 3H_2 + CO$$

However, in a typical steam reforming process, because of the large amount of steam necessary to reduce coke formation, the ratio of $H_2$ to CO is typically greater than 3:1 and can be 5:1.

While the steam reforming reaction is a principle source of synthesis gas, it does have some drawbacks. For example, it is a highly endothermic reaction, and, as discussed above, it produces a relatively high molar ratio of hydrogen to carbon monoxide. In some processes using synthesis gas, the excess hydrogen is not necessary and must be separated from the CO. For example, the manufacture of methanol or acetic acid from synthesis gas requires less than a 3:1 molar ratio of hydrogen to carbon monoxide.

There are other methods for preparing synthesis gas that are more attractive than the steam reforming reaction. Synthesis gas produced by the partial oxidation of methane, for example, is an exothermic reaction and produces synthesis gas having a lower ratio of hydrogen to carbon monoxide, according to the following equation:

$$CH_4 + \tfrac{1}{2}O_2 \rightarrow 2H_2 + CO$$

Synthesis gas can also be produced by the reaction of a hydrocarbyl compound such as methane with carbon dioxide. This reaction proceeds according to the following equation:

$$CH_4 + CO_2 \rightarrow 2H_2 + 2CO$$

This reaction, like the steam reforming reaction, is endothermic; however, it produces a low ratio of hydrogen to carbon monoxide (1:1) and is very useful where there is an abundant supply of carbon dioxide, for example, at a refinery or near naturally-occurring $CO_2$ reserves. Additionally, the reforming reaction using carbon dioxide can also be used in conjunction with the steam reforming reaction to adjust the ratio of hydrogen to carbon monoxide.

In all of the herein above described processes for preparing synthesis gas, it is advantageous to conduct the reaction of the hydrocarbyl compound with the source of oxygen in the presence of a catalyst. For example, catalysts for the steam reforming of methane and other hydrocarbons are commonly based on nickel as the active catalyst component. Vernon et al. in Catalysis Letters, Vol. 6, pages 181–186, 1990, discloses that methane can be converted to synthesis gas over catalysts such as palladium, platinum, or ruthenium on alumina, nickel on alumina, and certain transition metal oxides including $Pr_2Ru_2O_7$ and $Eu_2Ir_2O_7$. While Vernon et al. discloses that nickel on alumina catalysts are effective for the conversion of methane to synthesis gas using molecular oxygen, we have determined that such a catalyst, as well as commercial nickel-containing stem reforming and stem cracking catalysts, form coke and deactivate relatively rapidly. While the other catalysts described in Vernon et al., such as ruthenium on alumina, can be used to reform a hydrocarbyl compound such as methane in the presence of molecular oxygen, such transition metals are expensive and the transition metal catalyst based on ruthenium we evaluated exhibited lower conversion and lower selectivity to synthesis gas compared to the catalysts of this invention. Ashcroft et al. in Nature, Volume 352, page 225, 1991, describes the reforming of methane with carbon dioxide to form synthesis gas using catalysts such as palladium, ruthenium and iridium on alumina, as well as nickel on alumina.

U.S. Pat. No. 3,791,993 to Rostrup-Nielsen discloses the preparation of catalysts containing nickel for reforming gaseous or vaporizable liquid hydrocarbons using steam, carbon oxide, oxygen and/or air. The catalysts disclosed therein are prepared by coprecipitating a nickel salt, a magnesium salt and an aluminate to form a sludge, washing the sludge until it is substantially free of sodium and potassium, drying, and then dehydrating at 300° C. to 750° C. The ultimate catalyst is formed after a calcination step at 850° C. to 1100° C. The examples in the 3,791,993 U.S. Pat. show that compositions having a 1:1:2 or a 2:7:1 mole ratio of nickel, magnesium and aluminum, respectively, are suitable for convening naphtha to hydrogen-rich gaseous products using steam reforming.

In view of the great commercial interest in preparing synthesis gas by reforming readily available hydrocarbon feedstocks such as natural gas, and because of the benefits of conducting these reforming reactions in the presence of a catalyst that remains active for an extended period of use, there is a continuing need for new, less expensive, durable, coke resistant, more active and selective catalysts for the production of synthesis gas. The present invention provides such catalysts as well as a method for preparing synthesis gas using such catalysts.

The catalysts useful in the process of this invention can be prepared from a nickel-containing catalyst precursor compound having a structure that is referred to as "hydrotalcite-like." Hydrotalcite-like compounds are anionic clays, both natural and synthetic, that have a layered or sheet-like structure. For example, hydrotalcite, a naturally occurring mineral, has the chemical composition $[Mg_6Al_2(OH)_{16}]CO_3 \cdot 4H_2O$, and is composed of molecular "sheets", each sheet comprising a mixture of magnesium-and aluminum hydroxides. The sheets are separated by carbonate ions which balance the net positive charge of the sheets. In these "sheets," the magnesium and aluminum ions are 6-fold coordinate in hydroxide, and the resulting octahedra share edges to form infinite sheets. Water molecules, like the carbonate ions, are randomly located in the space between these sheets. Although pure hydrotalcite contains only magnesium and aluminum cations, a variety of naturally occurring, as well as synthetic hydrotalcite-like compositions are known. A general formula for these hydrotalcite-like compounds is:

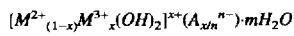

$$[M^{2+}_{(1-x)}M^{3+}_x(OH)_2]^{x+}(A_{x/n}^{n-}) \cdot mH_2O$$

wherein x generally is a number between 0.1 and 0.50, $M^{2+}$ is a 2+metal ion, for example, $Mg^{2+}$ and $M^{3+}$ is a 3+ metal ion, for example, $Al^{3+}$. The anion, $A^{n-}$, can be one of a number of anions such as carbonate. Hydrotalcite-like compounds containing borate as the anion have been disclosed by Bhattacharyya et al., in Inorganic Chemistry, Volume 31, page 3869, 1992. Drezdzon, in Inorganic Chemistry, Volume 27, page 4628, 1988, discloses the synthesis of isopolymetalate-pillared hydrotalcites.

As described above, hydrotalcite-like compounds share the "sheet-like" structural characteristics, which is conveniently identified using x-ray powder diffraction (XRD) analyses. Hydrotalcite-like materials typically have a d(001) value of at least about 7.8 Å. Based on the size of the anion used, the hydrotalcite-like molecules can have d(001) values up to 15 Å. The d(001) value is indicative of the inter layer spacing present in the hydrotalcite-like materials.

Hydrotalcite-like compounds have been used as catalysts in a variety of applications, such as catalysts for aldol condensation, polymerization of alien oxides, hydrogenation catalysts, alehydrogenation catalysts, etc., as described in F. Cavani et al., Catalysis Today, Volume 11, pages 173–301, 1991. Cavani et al. discloses that coprecipitated Ni, Al-based catalysts have been recognized as satisfying all the requirements for operation in steam reforming for methane production, and that coprecipitated catalysts calcined at 723° K. (450° C.) and reduced at 723° K. were active in the 673° to 923° K. (450° C. to 650° C.) range for steam cracking of naphtha to produce methane. U.S. Pat. No. 3,865,753 to Broecker et al. discloses the use of a catalyst prepared by calcining $[Ni_5MgAl_2(OH)_{16}]CO_3 \cdot 4H_2O$ at a temperature in the range of 350° C. to 550° C., and which is subsequently reduced with hydrogen. Such a catalyst was used for the steam cracking of hydrocarbons having 2 to 30 carbon atoms at a temperature in the range of 300° C. to 450° C. to form methane. Ross et al., J. of Catalysis, Volume 52, pages 280–290, 1978, have examined the reaction of methane with water over a catalyst derived from $Ni_6Al_2(OH)_{16}CO_3 \cdot 4H_2O$ at temperatures of 873° to 973° K. (600° C. –700° C.). Kruissink et al., J. Chemical Society, Faraday Trans. I, Volume 77, 649–663, 1981, discusses the thermal treatment of nickel-containing compositions having x-ray patterns characteristic of the hydrotalcite-like minerals; and Hernandez et al., Thermochemica Acta, Volume 81, 311–318, 1984, investigated the thermal decomposition of hydrotalcite-like compounds of formula $[Ni_{(1-x)}Al_x(OH)_2]^{x+}X^{n-}_{x/n} \cdot mH_2O$ where x ranges from 0.25 to 0.33 and X is carbonate and sulfate. Using X-ray diffraction studies, these researchers identified nickel oxide as the decomposition product at temperatures above 600° C., whereas the corresponding spinel, $NiAl_2O_4$, was formed at temperatures higher than 1000° C. British Patent 1,342,020, discloses catalysts having chemical composition $Ni_6Al_2CO_3(OH)_{16} \cdot 4H_2O$ and $Ni_3Mg_3Al_2CO_3(OH)_{16} \cdot 4H_2O$ and discloses that they have an application as hydrogenation, dealkylation and cracking catalysts. Clause et al, J. of Catalysis, Volume 133, 231–246 (1992) discloses the preparation and analysis of nickel-aluminum mixed oxides obtained by thermal decomposition of hydrotalcite-type precipitates. This paper also discloses that nickel-aluminum mixed oxides resulting from the thermal decomposition of hydrotalcite-like coprecipitates have been studied for steam reforming and methanation reactions.

SUMMARY OF THE INVENTION

In one aspect, this invention is a process for partial oxidation of at least one hydrocarbyl compound with a source of oxygen which comprises the steps of (A) feeding one or more gaseous or vaporizable hydrocarbyl compounds and an oxygen-containing gas comprising molecular oxygen, carbon dioxide, or mixtures thereof, into a suitable reaction zone containing a catalyst comprising mixtures formed by heat treating a hydrotalcite-like compound, (B) controlling temperatures within the reaction zone to temperatures in a range from about 400° C. to about 1400° C., and (C) reacting at least one of the hydrocarbyl compounds in the presence of the catalyst to form partial oxidation products, and expelling a product-containing gas mixture from the reaction zone. Advantageously, this process uses an oxygen-containing gas comprising carbon dioxide.

In a preferred embodiment of this process at least one of the hydrocarbyl compound is a hydrocarbon having about 1 to about 20 carbon atoms, the partial oxidation is carried out at temperatures within the reaction zone in a range from about 450° C. to about 1250° C., and the process further comprises (D) recovering from the product-containing gas mixture a partial oxidation product.

Another preferred embodiment of this invention comprises partial oxidation of at least one compound selected from the group consisting of methane, ethane, and other light hydrocarbon gases is carried out at temperatures within the reaction zone in a range from about 450° C. to about 1250° C., and the process further comprising (D) recovering from the product-containing gas mixture a synthesis gas comprising hydrogen and carbon monoxide.

Advantageously, catalyst used in the processes of this invention comprises a mixture formed by heat treating a hydrotalcite-like compound which contains rhodium and wherein heat treating comprises heating the rhodium-containing hydrotalcite-like compound to temperatures in a temperature range upward from at least about 400° C.

Advantageously in this invention the catalyst comprises a mixture formed by heat treating a hydrotalcite-like compound having formula

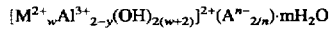

$$[M^{2+}_w Al^{3+}_{2-y}(OH)_{2(w+2)}]^{2+}(A^{n-}_{2/n}) \cdot mH_2O$$

where $M^{2+}$ is at least one divalent metal ion selected from the group consisting of magnesium, chromium, manganese, iron, cobalt, nickel, copper, and zinc ions; $M^{3+}$ is at least one trivalent metal ion selected from the group consisting of titanium, vanadium, chromium, manganese, iron, cobalt, nickel, gallium, ruthenium, rhodium, lanthanum, cerium, praseodymium, neodymium, samarium, europium, gadolinium, terbium, dysprosium, holmium, erbium, thulium, ytterbium, lutetium, and iridium ions; w is a number in a range from about 2 to about 20, preferably about 3 to about 12; y is a number in a range from about 0 to about 2; $An^-$ is an anion having a negative charge of n, preferably carbonate; and m is 0 or a positive number. A mixture of anions can also be used.

in preferred embodiments of processes using such catalysts, partial oxidation of at least one compound selected from the group consisting of methane, ethane, and other light hydrocarbon gases is carried out at temperatures within the reaction zone in a range from about 450° C. to about 1250° C., and the process further comprising (D) recovering from the product-containing gas mixture a synthesis gas comprising hydrogen and carbon monoxide.

In other preferred embodiments of processes using such catalysts, $M^{3+}$ is at least one trivalent metal ion selected from the group consisting of titanium, vanadium, chromium, manganese, iron, cobalt, nickel, gallium, ruthenium, rhodium, lanthanum, and iridium ions. More preferably $M^{3+}$ is at least one trivalent metal ion selected from the group consisting of iron, cobalt, nickel, ruthenium, rhodium, and iridium ions. In still other preferred embodiments of processes using such catalysts, $M^{2+}$is at least one divalent metal ion selected from the group consisting of magnesium, nickel, and copper ions. A mixture of anions can also be used.

Particularly advantageous in this invention are catalysts comprising a mixture formed by heat treating, preferably to temperatures in a temperature range upward from about 450° C., more preferably to temperatures in a temperature range from about 500° C. to about 1000° C., a hydrotalcite-like compound having formula

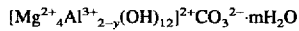

where y is a number in a range from about 0.00001 to about 1.5; and m is 0 or a positive number.

Particularly advantageous in this invention are catalysts comprising a mixture formed by heat treating, preferably to temperatures in a temperature range upward from about 450° C., more preferably to temperatures in a temperature range from about 500° C. to about 1000° C., a hydrotalcite-like compound having formula

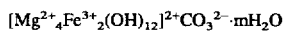

where m is 0 or a positive number.

In another aspect, this invention is reforming catalyst composition suitable for preparation of synthesis gas comprising hydrogen and carbon monoxide by partial oxidation of hydrocarbyl compounds using a source of oxygen comprising molecular oxygen or carbon dioxide which composition comprising a mixture formed by heat treating to a temperature of at least about 500° C., preferably to temperatures in a temperature range from about 500° C. to about 1000° C., a catalyst precursor composition having formula

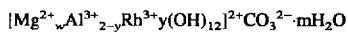

where y is a number in a range from about 0.001 to about 1.5; w is a number in a range from about 2 to about 20, preferably about 4; and m is 0 or a positive number.

In another aspect, this invention is a catalyst precursor composition which is convertible to a reforming catalyst useful in a process of this invention by heat treating to temperatures of at least about 500° C., the catalyst precursor composition comprising at least one hydrotalcite-like, which reforming catalysts formed by heat treating to temperatures of at least about 700° C. catalyst precursor composition comprising at least one hydrotalcite-like compound having formula

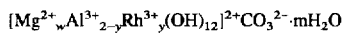

where y is a number in a range from about 0.00001 to about 1.5; w is a number in a range from about 2 to about 20, preferably about 4; and m is 0 or a positive number.

This invention is, also, a method for preparing synthesis gas comprising feeding a gaseous or vaporizable hydrocarbyl compound and an oxygen-containing gas comprising molecular oxygen or carbon dioxide to a suitable reaction zone containing a catalyst formed by heat treating a nickel containing hydrotalcite-like compound, and reacting the hydrocarbyl compound and the oxygen-containing gas in the presence of the catalyst at a temperature and at a pressure sufficient to form synthesis gas.

In another aspect, this invention is reforming catalysts formed by heat treating to temperatures of at least about 700° C. a catalyst precursor composition comprising at least one hydrotalcite-like compound having the formula:

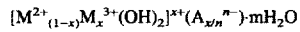

where $M^{2+}$is a metal ion having a valence of 2+and is at least $Ni^{2+}$ or preferably, a mixture of $Ni^{2+}$ and $Mg^{2+}$, optionally with one or more metals having a valence of 2+and preferably selected from $Cu^{2+}$, $Co^{2+}$, $Zn^{2+}$, $Fe^{2+}$ or $Mn^{2+}$; $M^{3+}$ is a metal ion having a valence of 3+ and suitably selected from $Al^{3+}$, $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$, preferably $M^{3+}$ is at least Al3+, optionally with one or more selected from $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$; x is a number of about 0.1 to about 0.50, wherein the value of x and (1−x) are obtained by combining all of the metal ions having a 3+ valence, and 2+ valence, respectively; $A^{n-}$ is an anion having a negative charge of n; and m is 0 or a positive number. A mixture of anions can also be used.

DETAILED DESCRIPTION OF THE INVENTION

As mentioned above, processes according to the present invention include processes for preparing synthesis gas by partial oxidation of hydrocarbyl compounds with a source of oxygen in a suitable reaction zone containing a catalyst comprising mixtures formed by heat treating a hydrotalcite-like compound.

Synthesis gas, a mixture of carbon monoxide (CO) and molecular hydrogen ($H_2$), is a valuable industrial feedstock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons. Synthesis gas produced by the partial oxidation of methane, for example, is an exothermic reaction and produces synthesis gas having a useful ratio of hydrogen to carbon monoxide, according to the following equation:

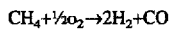

Preferred embodiments include processes for preparing synthesis gas by partial oxidation of any vaporizable hydrocarbyl compound. Hydrocarbyl compound used in processes of this invention suitably comprises one or more gaseous or vaporizable compounds that can be reacted with molecular oxygen or carbon dioxide to form synthesis gas. Most suitably, the hydrocarbyl compound is a hydrocarbon such as methane and/or ethane, however, various mounts of oxygen or other atoms can also be in the hydrocarbyl molecule. For example, hydrocarbyl compounds that can be converted to synthesis gas include methanol, dimethyl ether, ethylene oxide, and the like. However, the most preferable hydrocarbyl compounds are the low molecular weight hydrocarbons containing about 1 to about 20 carbons, more preferably 1 to about 10 carbon atoms. Methane, natural gas, which is mainly methane, or other light hydrocarbon mixtures which are readily available, inexpensive, are particularly preferred hydrocarbyl feed materials for processes of this invention. The natural gas can be either wellhead natural gas or processed natural gas. Composition of processed natural gas varies with the needs of the ultimate user. A typical processed natural gas composition contains about 70 percent by weight of methane, about 10 percent by weight of ethane, 10 percent to 15percent of $CO_2$, and the balance is made up of smaller amounts of propane, butane and nitrogen. Mixtures of hydrocarbyl and/or hydrocarbon compounds can also be used.

Light hydrocarbon gas streams can be mixed with any inert diluent such as nitrogen, helium, neon, argon, krypton, xenon, or other gas, which does not interfere with the desired reaction. Nitrogen is a diluent of choice.

Typically for a process in which synthesis gas is made from methane, ethane, and other light hydrocarbon gases in the presence of a catalyst, the catalyst is within the electrochemical reactor, generally, within the electrochemical reactor cell. However, decisions as to which zones to use for oxygen-containing gas stream and the other gas stream, and the location of catalyst and inert support, if any, will depend on which arrangement is most suitable for the particular application of the present invention. Determination of an optimal arrangement is well within the ability of one of ordinary skill to obtain without undue experimentation.

The catalytic materials useful in the method of this invention for preparing synthesis gas are suitably prepared by heat treating a catalyst precursor composition comprising one or more hydrotalcite-like compounds having formula $$[M^{2+}_{w}Al^{3+}_{2-y}M^{3+}_{y}(OH)_{2(w+2)}]^{2+}(A^{n-}_{2/n}) \cdot mH_2O \quad (1)$$

where $M^{2+}$ is at least one divalent metal ion selected from the group consisting of magnesium, chromium, manganese, iron, cobalt, nickel, copper, and zinc ions; $M^{3+}$ is at least one trivalent metal ion selected from the group consisting of titanium, vanadium, chromium, manganese, iron, cobalt, nickel, gallium, ruthenium, rhodium, lanthanum, cerium, praseodymium, neodymium, samarium, europium, gadolinium, terbium, dysprosium, holmium, erbium, thulium, ytterbium, lutetium, and iridium ions; w is a number in a range from about 2 to about 20, preferably about 3 to about 12; y is a number in a range from about 0 to about 2, preferably in a range from about 0.00001 to about 1.5; $A^{n-}$ is an anion having a negative charge of n, preferably carbonate; and m is 0 or a positive number. A mixture of anions can also be used.

$M^{3+}$ in the formula (1) above is at least one trivalent metal ion selected from the group consisting of titanium, vanadium, chromium, manganese, iron, cobalt, nickel, gallium, ruthenium, rhodium, lanthanum, and iridium ions. More preferably $M^{3+}$ is at least one trivalent metal ion selected from the group consisting of iron, cobalt, nickel, ruthenium, rhodium, and iridium ions. Preferably $M^{3+}$ is at least $Rh^{3+}$. When a mixture of $Al^{3+}$ and at least one other metal ion having a valence of 3+ are present, the atomic ratio of $Al^{3+}$ to the other $M^{3+}$ ion or ions present in suitably about 10,000:1 to about 0.05:1.

The anion, A, in the formula (1) above can be any anion that provides for a hydrotalcite-like structure and can be, for example, carbonate, nitrate, a halide (e.g. Cl–, Br–), chlorate, sulfate, hydroxide, oxide, carboxylates and polycarboxylates; particularly those having one to about 20 carbon atoms, including, for example, acetate, benzoate, the phthalates, and the like, phosphates, boron containing anions, metalales of metals from Group VB and Group VIB of the Periodic Table, "Webster's Ninth New Collegiate Dictionary" Merriam-Webster Inc., Springfield, Mass., U.S.A. (1984) page 874. Examples of borates and metalates include, $B(OH)_4-$, $[B_3O_3(OH)_4]-$, $[B_3O_3(OH)_5]^{2-}$, $[B_4O_5(OH)_4]^{2-}$, $V_2O_7^{4-}$, $HV_2O_7^{3-}$, $V_4O_{12}^{4-}$, $V_3O_9^{3-}$ and $V_{10}O_{28}^{6-}$. Examples of phosphates include $PO_4^{3-}$, $HPO_4^{2-}$ and $H_2PO_4-$. Other anions that can be used include $Nb_6O_{19}^{8-}$, $HNb_6O_{19}^{7-}$, $H_2Nb_6O_{19}^{6-}$, $NbO_4^{3-}$, $Ta_6O_{19}^{8-}$, $HTa_6O_{19}^{7-}$, $TaO_4^{3-}$, $Mo_7O_{24}^{6-}$, $HW_6O_{21}^{5-}$, and Keggin-type anions such as $PW_{11}O_{39}^{7-}$ and $SiW_{11}O_{38}^{7-}$ which are stable at a pH above above 6. The number w is about 2 to about 20, preferably 3 to about 12. The amount of water present in the hydrotalcite-like catalyst precursor is variable. The amount of water can be such that the value m in the formula above is about 0 to about 20.

Preferred hydrotalcite-like catalyst precursor compounds useful in the method of this invention are those compounds having the formula (1) above where $M^{2+}$ is $Mg^{2+}$, a mixture of $Ni^{2+}$ and $Mg^{2+}$, a mixture of $Ni^{2+}$ and $Cu^{2+}$ or a mixture of $Ni^{2+}$, $Cu^{2+}$ and $Mg^{2+}$ and where $M^{3+}$ is a mixture of $Al^{3+}$ and $Rh^{3+}$, $Al^{3+}$, $Fe^{3+}$ or a mixture thereof. In these preferred catalyst precursor compositions, wherein a mixture of nickel and magnesium and/or copper are used, the molar ratio of $Ni^{2+}$ to $Mg^{2+}$ and/or $Cu^{2+}$ is in the range of about 1:100 to about 100:1. Specific examples of preferred hydrotalcite-like catalyst precursor compounds are:

$$[Mg^{2+}_4Al^{3+}_{2-y}Rh^{3+}_y(OH)_{12}]^{2+}CO_3^{2-} \cdot mH_2O$$

$$[Mg^{2+}_4Fe^{3+}_2(OH)_{12}]^{2+}CO_3^{2-} \cdot mH_2O$$

where y is a number in a range from about 0.00001 to about 1.5; and m in these formulas is about 0 to about 10.

The hydrotalcite-like catalyst precursor compounds described herein are activated through heat treatment, i.e. they are thermally activated. The heat treatment is typically conducted by subjecting the hydrotalcite-like compound to a temperature of at least 700° C., more preferably at least about 800° C., for a time sufficient to convert the hydrotalcite-like catalyst precursor compound into an active catalyst for the reforming of hydrocarbyl compounds. This heating can be done prior to using the catalyst precursor for a reforming reaction, or it can be done in the reactor apparatus used for the reforming reaction, preferably under reforming conditions. For example, the temperature used for the reforming reactions are typically sufficiently high to activate the catalyst precursor compounds. During the heat treatment to form the active catalyst, the hydrotalcite-like compounds first lose water that is located between the hydroxide layers. This typically occurs at temperatures in the range of about 200° C. to about 250° C. This is a reversible reaction, however, since the dehydrated hydrotalcite-like compositions can be again hydrated to restore their original hydrotalcite-like structures. Upon heating to higher temperatures, for example, temperatures in excess of 450° C., another change occurs in the catalyst precursor where there is a loss of the anion, if it is volatile, or, for example, the anion loses water if it is not volatile. However, this transformation does not irreversibly destroy the layer structure of the hydrotalcite-like composition since a layer structure can be restored by replacing the anion or hydrating the anion. Upon heating to still higher temperatures, for example, temperatures in excess of about 700° C., there is an irreversible loss of layer structure, and these heat-activated compositions are the active catalysts for the reforming of hydrocarbyl compounds according to the method of this invention.

The preferred catalyst compositions of this invention for preparing synthesis gas are those compositions formed by heat treating one or more hydrotalcite-like compounds hydrotalcite-like compounds having formula

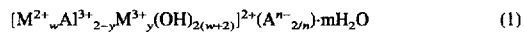

$$[M^{2+}{}_w Al^{3+}{}_{2-y} M^{3+}{}_y (OH)_{2(w+2)}]^{2+} (A^{n-}{}_{2/n}) \cdot mH_2O \qquad (1)$$

where M2+ is at least one divalent metal ion selected from the group consisting of magnesium, chromium, manganese, iron, cobalt, nickel, copper, and zinc ions; $M^{3+}$ is at least one trivalent metal ion selected from the group consisting of titanium, vanadium, chromium, manganese, iron, cobalt, nickel, gallium, ruthenium, rhodium, lanthanum, cerium, praseodymium, neodymium, samarium, europium, gadolinium, terbium, dysprosium, holmium, erbium, thulium, ytterbium, lutetium, and iridium ions; w is a number in a range from about 2 to about 20, preferably about 3 to about 12; y is a number in a range from about 0 to about 2, preferably in a range from about 0.00001 to about 1.5; $A^{n-}$ is an anion having a negative charge of n and is an anion that provides for a hydrotalcite-like structure, and is suitably selected from carbonate, nitrate, a halide, sulfate, chlorate, hydroxide, oxide, carboxylate, phosphates, boron containing anions, Group Vb and Vlb metalates, and the like, and, preferably, A is carbonate; and where the value of m is 0 or a positive number, preferably 0 to about 4. Particularly, preferred catalyst compositions are those herein above described hydrotalcite-like compounds that have been exposed to the reactants and reaction conditions used for the preparation of synthesis gas by the reaction of a hydrocarbyl compound with molecular oxygen, or by the reaction of a hydrocarbyl compound with carbon dioxide.

A preferred group of anions useful in the hydrotalcite-like compounds used to make catalysts is the group consisting of molybdates and polyoxomolybdates, for example $Mo_7O_{24}{}^{6-}$, $MoO_4{}^{2-}$, $MoO_{4-}$, and the like. These molybdates and polyoxomolybdates are preferred because they will impart coke reducing capability to the catalyst composition of this invention.

The hydrotalcite-like precursor compounds used in the method of this invention can be prepared by using procedures known in the art. However, one procedure for preparing these hydrotalcite-like compounds comprises combining in solution, preferably in aqueous solution, a nickel 2+ compound, optionally with one or more of the other metal ions discussed hereinabove having a 2+ valence, with one or more metal ions as described hereinabove having a 3+ valence. Suitable metal compounds are the nitrate salts, chloride salts, sulfate salts, and like salts. The solution containing the 2+ and 3+ metal ion is combined with a solution of the desired anion, A, or a precursor to the anion. For example, A may be $CO_3{}^{2-}$, $SO_4{}^{2-}$, Cl⁻, etc. An antion precursor is a compound which produces the desired anion under the reaction conditions used to prepare the hydrotalcite-like compound. For example, $NaVO_3$ is a precursor to the anion $V_2O_7{}^{4-}$ because, at a reaction mixture pH of 10-11, $NaVO_3$ yields $V_2O_7{}^{4-}$. The pH dependent behavior of some transition element metalates is described in Kepert, D. L., "The Early Transition Metals," Academic Press, London (1972).

For example, in order to prepare a nickel/aluminum hydrotalcite-like compound having a carbonate artion, the nickel and aluminum salt are combined in water and then added to a carbonate containing solution. From the table above, the approximate pH range to produce the hydrotalcite-like compound is about 6–12. Similarly, if a copper-nickel-aluminum containing hydrotalcite-like compound is desired, the pH range needs to be 6 to 12. If the desired anion, $A^{n-}$, is not stable at this pH range, then the hydrotalcite-like structures will not form. If the pH of the reaction mixture used to form the hydrotalcite-like compound requires adjustment, a base such as ammonium hydroxide, an alkali metal hydroxide or a tetralkylammonium hydroxide can be used. If an acid is required to adjust the pH, a mineral acid such as nitric acid or hydrochloric acid can be used. Also, after the proper pH has been achieved, the solution generally requires heating for a period of time, preferably at a temperature of about 40° to about 100° C., to accelerate the formation of the hydrotalcite-like precipitate, which can be collected by filtration.

The molar ratio of the 2+ metal ions to 3+ metal ions is preferably about 9:1 to about 1:1. The mole ratio of the anion used to the total of 2+ and 3+ metal ions depends on the charge on the antion to be incorporated. For each metal ion with a 3+ valence, a corresponding negative charge in the anion layer of the hydrotalcite-like compound is required. Generally, a molar excess of anion is used during the preparation of the hydrotalcite-like compound in order to ensure complete reaction.

The 2+ metal ion and 3+ metal ion compounds are typically mixed together and added slowly, with stirring, to a solution of the antion. As stated above, the resulting solution must have the proper pH. Slower addition and a more elevated temperature (a pressure vessel can be used) tends to produce a product with larger crystals.

Copending U.S. Pat. application Ser. No. 07/745,902, filed on Aug. 16, 1991, in the name of Bhattacharyya et at. and hereinabove specifically incorporated by reference, also discloses the preparation of hydrotalcite-like compounds.

In the reforming method of this invention a vaporizable hydrocarbyl compound and an oxygen containing gas comprising molecular oxygen or carbon dioxide are fed to a suitable reaction zone, which zone contains a catalyst formed by heat treating one or more of the nickel-containing hydrotalcite-like compounds described hereinabove, and reacting the hydrocarbyl compound and the oxygen-containing gas in the presence of the reforming catalyst at reaction conditions sufficient to produce synthesis gas in the form of a mixture of molecular hydrogen and carbon monoxide. The mole ratio of hydrogen to carbon monoxide may vary, however, it is suitably in the range of about 0.1:1 to about 5:1.

The hydrocarbyl compound used in the method of this invention suitably comprises one or more gaseous or vaporizable compounds that can be reacted with molecular oxygen or carbon dioxide to form synthesis gas. Most suitably, the hydrocarbyl compound is a hydrocarbon, however, various amounts of oxygen or other atoms can also be in the hydrocarbyl molecule. For example, hydrocarbyl compounds that can be converted to synthesis gas include methanol, dimethylether, ethylene oxide, and the like. However, the most preferable hydrocarbyl compounds are the low molecular weight hydrocarbons containing about 1 to about 20 carbons, more preferably 1 to about 10 carbon atoms. Methane and natural gas, which is mainly methane, are readily available, inexpensive, and are the most preferred hydrocarbyl feed materials for the method of this invention. Mixtures of hydrocarbyl and/or hydrocarbon compounds can also be used.

The oxygen-containing gas used in the method of this invention is either a gas comprising molecular oxygen or a gas comprising carbon dioxide. The gas comprising molecular oxygen is used in the method of this invention for preparing synthesis gas by the oxidation of the hydrocarbyl compound to synthesis gas. When methane is the hydrocarbyl compound, this reaction proceeds according to the partial-oxidation reaction described in the following equation:

$$CH_4 + \tfrac{1}{2}O_2 \rightarrow CO + 2H_2$$

The oxygen-containing gas used in the method of this invention can be pure molecular oxygen or a mixture of molecular oxygen with one or more other gases such as nitrogen, helium, or some other inert gas. Air is a suitable source of molecular oxygen. The molecular oxygen can be in the oxygen-containing gas at a level of about 1% to about 100%, preferably about 20% to about 100%, most preferably the molecular oxygen containing gas is substantially pure, e.g. 98%, or pure, e.g. +99% molecular oxygen.

The amount of molecular oxygen relative to the hydrocarbyl compound fed to the reactor containing the catalyst derived from a hydrotalcite-like catalyst precursor is such that there is sufficient oxygen to form synthesis gas. When methane is used the molar ratio of molecular oxygen to methane in the feed compound added to the reaction zone is about 1:2. However, when high selectivity to synthesis gas is desired, the ratio of molecular oxygen to methane is about 1:2.1, and when complete methane conversion is desired, the optimal ratio of molecular oxygen to methane is about 1:1.9.

In the method of this invention wherein a hydrocarbyl compound is reacted with molecular oxygen to form synthesis gas, the reaction temperature is suitably in the range of about 400° C. to about 1000° C., more preferably about 600° C. to about 900° C. Additionally, since the reaction of the hydrocarbyl compound with molecular oxygen is exothermic, the heat produced by the process can be used as an energy source to operate other processes in a chemical manufacturing plant. For example, it can be used to generate high pressure stem. The pressure for the reaction of a hydrocarbyl compound with molecular oxygen is suitably in the range of about 0.1 atmospheres absolute to about 50 atmospheres absolute, preferably about 25 atmospheres absolute to about 40 atmospheres absolute. The space velocity is suitably that which provides for the conversion of a major portion of the hydrocarbyl feed to synthesis gas, and preferably the volumetric space velocity is in the range of about 10 $hr^{-1}$ to about $1 \times 10^9$ $hr^{-1}$, more preferably about 1200 to about $1 \times 10^6$ $hr^{-1}$. The volumetric space velocity being calculated based on the total volume of reactant gases, i.e. the gaseous hydrocarbyl feed component and the molecular-oxygen containing gas component, and the volume of the catalyst in the reactor.

Although other feed materials can be added along with the molecular oxygen-containing gas and the hydrocarbyl feed compound, for example, water or steam, it is generally not necessary to do so. One of the advantages of the method of this invention wherein a hydrocarbyl compound is converted to synthesis gas by reaction with molecular oxygen, is that catalysts derived from hydrotalcite-like catalyst precursor compounds are very resistant to coke formation. Therefore, it is not essential to add stem or water to eliminate coking of the catalyst. However, stem or water can be added in order to adjust the ratio of $H_2$ to CO in the synthesis gas product.

In the method of this invention wherein a gas comprising carbon dioxide is reacted with a hydrocarbyl compound, the gas comprising carbon dioxide is suitably about 1 to about 100% carbon dioxide, more preferably about 20% to about 100% carbon dioxide, and most preferably it is substantially pure carbon dioxide. The gas comprising carbon dioxide can contain other gases, for example, nitrogen, helium, argon and the like, however, as stated above, it is preferable to use substantially pure carbon dioxide.

In the method of this invention wherein hydrocarbyl compounds are reformed to synthesis gas using carbon dioxide, the addition of water or stem is beneficial to reduce the coking of the catalyst. The mount of stem present should be an amount sufficient to control the formation and deposition of coke on the catalyst so that deactivation does not occur. Preferably, the mount of water in the form of steam is suitably about 10 to about 50 percent of the feed gases, more preferably about 20 to about 30 percent of the total feed gas. Other materials can be added to the total feed gasses to promote the longevity of the catalyst. For example, hydrogen sulfide, or other source of sulfur, preferably a volatile source of sulfur, can be added along with the feed gas to the carbon dioxide reforming reaction. If used, hydrogen sulfide or other volatile sulfur-containing compound, e.g. an alkyl thiol, dialkyl sulfide or dialkyl disulfide, is present in the feed at a level of about 10 parts per million by weight to about 100 parts per million by weight, based on the total feed gas. However, we have determined that the catalysts of this invention are effective for reforming hydrocarbyl compounds without the use of a sulfur-containing compound in the feed gas.

The amount of carbon dioxide relative to the hydrocarbyl compound fed to the reactor containing the catalyst derived from the nickel-containing, hydrotalcite-like catalyst precursor is such that there is sufficient carbon dioxide to effectively convert the hydrocarbyl compound to synthesis gas. Suitably, the molar ratio of carbon dioxide to carbon in the hydrocarbyl feed compound is at least about 0.8:1, preferably about 1:1 to about 5:1, most preferably about 1:1 to about 2:1.

The reaction temperature for the reforming of a hydrocarbyl compound using carbon dioxide is suitably in the range of about 750° C. to about 950° C., more preferably about 850° C. to about 900° C. The pressure for the reaction of the hydrocarbyl compound with carbon dioxide is suitably in the range of about 0.1 atmosphere absolute to about 50 atmospheres absolute, more preferably about 10 atmospheres absolute to about 35 atmospheres absolute. The space velocity for this reaction is suitably that which provides for the conversion of a major portion of the hydrocarbyl compound, preferably methane, to synthesis gas. Suitable volumetric space velocities are in the range of 1000 $hr^{-1}$ to about $1 \times 10^6$ $hr^{-1}$, more preferably about $1 \times 10^4$ $hr^{-1}$ to about $1 \times 10^5$ $hr^{-1}$. The volumetric space velocity being calculated based on the total volume of gas entering the reactor containing the catalyst and the volume of the catalyst.

The type of reactor used in the method of this invention is any type reactor that can be. used to conduct a gas phase reaction over a heterogeneous, solid catalyst. For example, a fixed bed reactor, a fluidized bed reactor and the like.

The catalyst composition described herein above can be used as such, or they can be supported on one or more inert support materials such as alpha alumina, silica, and the like. Preferably the catalyst composition, either supported or unsupported, are formed into shapes that are suitable for use in gas-phase reaction vessels, e.g. spheres, cylinders, rings, etc.

EXAMPLES OF THE INVENTION

The following examples are being presented to illustrate certain embodiments of the invention disclosed herein; however, they should not be construed as limiting the scope thereof.

EXAMPLE 1

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 0.471 g (0.00179 mol) of $RhCl_3 \cdot H_2O$, 43.62 g (0.15 mol) of $Mg(NO_3)_2 \cdot 6H_2O$ and 27.46 g (0.0732 mol) of $Al(NO_3)_3 \cdot 9H_2O$, and 350 mL of water was prepared and added dropwise to the first solution while stirring for a period of about 1 h. After addition was complete, the gelatinous mixture (pH=8.7) was heated for about 15 hr at 80° to 85° C. The cooled mixture was filtered, washed repeatedly with water, and dried overnight under vacuum at 70° C. The XRD of the material showed a typical hydrotalcite-type structure with d(003) value of 7.8 Å. This material corresponds to the formulation $Mg_4Rh_{0.0477}Al_{1.9523}(OH)_{12}CO_3$.

EXAMPLE 2

The material described in Example 1 was calcined by placing a weighed amount of the material in a calciner and raising the temperature at 20° C./min until a temperature of 450° to 500° C. was reached. The material was kept at that temperature for about 15 hr and then sieved to different mesh sizes. This material corresponds to the formulation $Mg_4Rh_{0.0477}Al_{1.9523}O_7$.

EXAMPLE 3

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 0.235 g (0.000891 mol) of $RhCl_3 \cdot H_2O$, 43.62 g (0.15 mol) of $Mg(NO_3)_2 \cdot 6H_2O$ and 27.8 g (0.0741 mol) of $Al(NO_3)_3 \cdot 9H_2O$, and 350 mL of water was prepared and added dropwise to the first solution while stirring for a period of about 1 hr. After addition was complete, the gelatinous mixture (pH=8.9) was heated for about 15 hr at 90° to 95° C. The cooled mixture was filtered, washed repeatedly with water, and dried overnight under vacuum at 70° C. The XRD of the material showed a typical hydrotalcite-type structure with d(003) value of 7.8 Å. This material corresponds to the formulation $Mg_4Rh_{0.0238}Al_{1.976}(OH)_{12}CO_3$.

EXAMPLE 4

The material described in Example 3 was calcined by placing a weighed mount of the material in a calciner and raising the temperature at 20° C./min until a temperature of 450° to 500° C. was reached. The material was kept at that temperature for about 15 hr and then sieved to different mesh sizes. This material corresponds to the formulation $Mg_4Rh_{0.0238}Al_{1.9762}O_7$.

EXAMPLE 5

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 0.0046 g (0.0000176 mol) of $RhCl_3 \cdot H_2O$, 43.62 g (0.15 mol) of $Mg(NO_3)_2 \cdot 6H_2O$ and 28.13 g (0.075 mol) of $Al(NO_3)_3 \cdot 9H_2O$, and 350 mL of water was prepared and added dropwise to the first solution while stirring for a period of about 1 hr. After addition was complete, the gelatinous mixture (pH=8.9) Was heated for about 15 hr at 80° to 85° C. The cooled mixture was filtered, washed repeatedly with water, and dried overnight under vacuum at 70° C. The XRD of the material showed a typical hydrotalcite-type structure with d(003) value of 7.6 Å. This material corresponds to the formulation $Mg_4Rh_{0.0005}Al_{1.9995}(OH)_{12}CO_3$.

EXAMPLE 6

The material described in Example 5 was calcined by placing a weighed amount of the material in a calciner and raising the temperature at 20° C./min until a temperature of 450° to 500° C. was reached. The material was kept at that temperature for about 15 hr and then sieved to different mesh sizes. This material corresponds to the formulation $Mg_4Rh_{0.0005}Al_{1.9995}O_7$.

EXAMPLE 7

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 0.590 g (0.00224 mol) of $RhCl_3 \cdot H_2O$, 43.62 g (0.15 mol) of $Mg(NO_3)_2 \cdot 6H_2O$ and 27.30 g (0.073 mol) of $Al(NO_3)_3 \cdot 9H_2O$, and 350 mL of water was prepared and added dropwise to the first solution while stirring for a period of about 1 hr. After addition was complete, the gelatinous mixture (pH=9.7) was heated for about 15 hr at 85° to 90° C. The cooled mixture was filtered, washed repeatedly with water, and dried overnight under vacuum at 70° C. The XRD of the material showed a typical hydrotalcite-type structure with d(003) value of 7.7 Å. This material corresponds to the formulation $Mg_4Rh_{0.0596}Al_{1.9403}(OH)_{12}CO_3$.

EXAMPLE 8

The material described in Example 7 was calcined by placing a weighed mount of the material in a calciner and raising the temperature at 20° C./min until a temperature of 450° to 500° C. was reached. The material was kept at that temperature for about 15 hr and then sieved to different mesh sizes. This material corresponds to the formulation $Mg_4Rh_{0.0596}Al_{1.9403}O_7$.

EXAMPLE 9

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 0.353 g (0.00134 mol) of $RhCl_3 \cdot H_2O$, 43.62 g (0.15 mol) of $Mg(NO_3)_2 \cdot 6H_2O$ and 27.63 g (0.0732 mol) of $Al(NO_3)_3 \cdot 9H_2O$, and 350 mL of water was prepared and added dropwise to the first solution while stirring for a period of about 1 hr. After addition was complete, the gelatinous mixture (pH=9.0) was heated for about 15 hr at 85° to 90° C. The cooled mixture was filtered, washed repeatedly with water, and dried overnight under vacuum at 70° C. The XRD of the material showed a typical hydrotalcite-type structure with d(003) value of 7.7 Å. This material corresponds to the formulation $Mg_4Rh_{0.0357}Al_{1.9643}(OH)_{12}CO_3$.

EXAMPLE 10

The material described in Example 9 was calcined by placing a weighed amount of the material in a calciner and raising the temperature at 20° C./min until a temperature of 450° to 500° C. was reached. The material was kept at that temperature for about 15 hr and then sieved to different mesh sizes. This material corresponds to the formulation $Mg_4Rh_{0.0357}Al_{1.9643}O_7$.

The catalyst prepared or described in the above examples were evaluated for the formation of synthesis gas by the partial oxidation of methane. The evaluations were conducted using an apparatus consisting of a 12 inch by 16 mm diameter quartz reactor tube mounted vertically in a 3-zone furnace. Each zone was 2 inches. Positioned in the center of the reactor tube was a 4 mm diameter quartz tube. Typically 4 mL of catalyst was loaded in the quartz reactor tube and, using quartz wool plugs, the catalyst bed was positioned in the central heating zone of the furnace. Three thermocouples were located inside the 4 mm tube: one at the top, middle and bottom of the catalyst bed. The feed gas for the evaluation was a mixture of 7.5% oxygen ($O_2$) and 15% methane in nitrogen. The nitrogen maintained the mixture outside of the explosive envelope and it also served as an internal standard for the analysis of the product mixture by gas chromatography. The methane to synthesis gas evaluations were conducted at near atmospheric pressure and the hereinabove described testing apparatus was designed to shut off automatically when the pressure exceeded about 30" of water. The chromatographic analysis was done automatically at intervals of 20–30 hr. The tables that follow do not report all of the analytical data obtained, rather they show representative data taken early, in the middle, and at the end of the evaluation.

Hydrogen formation was analyzed by gas chromatography, and helium was used as the carrier gas (a thermal conductivity detector was used). Selectivities reported for hydrogen are greater than 100% because two moles of hydrogen are theoretically possible for each mole of methane converted to synthesis gas by partial oxidation using molecular oxygen. Reaction temperature, flow rates, space velocity, residence time were as reported in the tables for each run.

Tables 1–4 show the results for the preparation of synthesis gas by the oxidation of methane using processes and catalysts of this invention. Specifically, Table 1 shows results obtained using a catalyst derived from a hydrotalcite-like compound having formula: $Mg_4Rh_{0.0477}Al_{1.9523}(OH)_{12}CO_3$ and prepared according to Example 2. Table 2 shows results obtained using a catalyst derived from a hydrotalcite-like compound having formula: $Mg_4Rh_{0.0238}Al_{1.9762}(OH)_{12}CO_3$ and prepared according to Example 4. Table 3 shows results obtained using a catalyst derived from a hydrotalcite-like compound having formula: $Mg_4Rh_{0.0005}Al_{1.9995}(OH)_{12}(OH)_{12}CO_3$ and prepared according to Example 6. Table 4 shows results obtained using a catalyst derived from a hydrotalcite-like compound having formula: $Mg_4Rh_{0.0598}Al_{1.9403}(OH)_{12}CO_3$ and prepared according to Example 6. These data show that the catalysts containing rhodium, magnesium and aluminum prepared from the hydrotalcite-like precursors all have excellent catalytic activity for the conversion of methane to synthesis gas by partial oxidation and did not coke during the entire period tested.

TABLE 1

Partial Oxidation of Methane Using Catalyst Derived from $Mg_4Rh_{0.0477}Al_{1.9523}(OH)_{12}CO_3$

| Hours on Stream | 56:15 | 61:57 | 65:45 | 67:39 |
|---|---|---|---|---|
| Conditions[a] Temp. °C. | 500 | 650 | 750 | 800 |
| Conversions: | | | | |
| $CH_4$, mol %[b] | 49.11 | 83.93 | 95.8 | 98.14 |
| $O_2$ | 100.0 | 100.0 | 100.0 | 100.0 |
| Selectivities, mol % | | | | |
| $H_2$ | 120.25 | 154.68 | 167.83 | 165.74 |
| CO | 37.53 | 88.37 | 97.2 | 98.47 |
| $CO_2$ | 62.47 | 11.63 | 2.83 | 1.53 |
| $H_2$/CO | 3.2 | 1.75 | 1.72 | 1.68 |

[a]Catalyst volume = 4.0 mL, Feed gas flow rate = 101.6 mL/min, Space velocity = $1.52 \times 10^3$ hr$^{-1}$, Weight hourly space velocity = $3.93 \times 10^3$ mL g/hr, Residence time = 0.334 to 0.241 sec.
[b]Conversion based on the difference between the amount of methane added to the reactor and the amount of methane recovered.

TABLE 2

Partial Oxidation of Methane Using Catalyst Derived from $Mg_4Rh_{0.0238}Al_{1.9762}(OH)_{12}CO_3$

| Hours on Stream | 56:16 | 61:58 | 65:46 | 67:40 |
|---|---|---|---|---|
| Conditions[a] Temp. °C. | 500 | 650 | 750 | 800 |
| Conversions: | | | | |
| $CH_4$, mol %[b] | 48.34 | 83.56 | 95.54 | 97.95 |
| $O_2$ | 100.0 | 100.0 | 100.0 | 100.0 |
| Selectivities, mol % | | | | |
| $H_2$ | 120.87 | 156.72 | 163.78 | 165.53 |
| CO | 36.15 | 88.05 | 96.99 | 98.33 |
| $CO_2$ | 63.85 | 11.95 | 3.01 | 1.67 |
| $H_2$/CO | 3.34 | 1.78 | 1.69 | 1.68 |

[a]Catalyst volume = 4.0 mL, Feed gas flow rate = 101.6 mL/min, Space velocity = $1.52 \times 10^3$ hr$^{-1}$, Weight hourly space velocity = $3.93 \times 10^3$ mL g/hr, Residence time = 0.334 to 0.241 sec.
[b]Conversion based on the difference between the amount of methane added to the reactor and the amount of methane recovered.

TABLE 3

Partial Oxidation of Methane Using Catalyst Derived from $Mg_4Rh_{0.0005}Al_{1.9995}(OH)_{12}CO_3$

| Hours on Stream | 3:48 | 61:58 | 65:46 | 67:40 |
|---|---|---|---|---|
| Conditions[a] Temp. °C. | 400 | 650 | 750 | 800 |
| Conversions: | | | | |
| $CH_4$, mol %[b] | 0.81 | 16.69 | 33.09 | 37.42 |
| $O_2$ | 2.32 | 49.04 | 100.0 | 100.0 |
| Selectivities, mol % | | | | |
| $H_2$ | 0.00 | 73.01 | 34.35 | 53.43 |

TABLE 3-continued

Partial Oxidation of Methane Using Catalyst Derived from
$Mg_4Rh_{0.0005}Al_{1.9995}(OH)_{12}CO_3$

| CO | 0.00 | 22.00 | 20.52 | 31.20 |
|---|---|---|---|---|
| CO$_2$ | 100.00 | 78.00 | 76.93 | 62.84 |
| H$_2$/CO | 0.00 | 3.32 | 1.67 | 1.71 |

<sup>a</sup>Catalyst volume = 4.0 mL, Feed gas flow rate = 100.6 mL/min, Space velocity = 1.51 × 10³ hr⁻¹, Weight hourly space velocity = 4.47 × 10³ mL g/hr, Residence time = 0.387 to 0.243 sec.
<sup>b</sup>Conversion based on the difference between the amount of methane added to the reactor and the amount of methane recovered.

TABLE 4

Partial Oxidation of Methane Using Catalyst Derived from
$Mg_4Rh_{0.0598}Al_{1.9403}(OH)_{12}CO_3$

| Hours on Stream | 56:15 | 61:57 | 65:44 | 67:38 |
|---|---|---|---|---|
| Conditions<sup>a</sup> Temp. °C. | 500 | 650 | 750 | 800 |
| Conversions: | | | | |
| CH$_4$, mol %<sup>b</sup> | 49.83 | 84.03 | 95.80 | 98.08 |
| O$_2$ | 100.0 | 100.0 | 100.0 | 100.0 |
| Selectivities, mol % | | | | |
| H$_2$ | 116.72 | 155.04 | 161.64 | 163.98 |
| CO | 39.08 | 88.45 | 97.17 | 98.47 |
| CO$_2$ | 60.92 | 11.55 | 2.83 | 1.53 |
| H$_2$/CO | 2.99 | 1.75 | 1.66 | 1.67 |

<sup>a</sup>Catalyst volume = 4.0 mL, Feed gas flow rate = 101.6 mL/min, Space velocity = 1.52 × 10³ hr⁻¹, Weight hourly space velocity = 4.69 × 10³ mL g/hr, Residence time = 0.332 to 0.240 sec.
<sup>b</sup>Conversion based on the difference between the amount of methane added to the reactor and the amount of methane recovered.

EXAMPLE 11

A 1 L, 3-neck round bottom flask equipped with a thermometer, reflux condenser, and mechanical stirrer was charged with 400 mL deionized water, 7.42 g (0.07 mol) of Na$_2$CO$_3$, and 18.0 g (0.45 mol) of NaOH pellets. A second solution containing 28.28 g (0.07 mol) of Fe(NO$_3$)$_3$·9H$_2$O, 38.46 g (0.15 mol) of Mg(NO$_3$)$_2$·6H$_2$O and 375 mL of water was prepared and added dropwise to the first solution while stirring for a period of about 1 hr. After addition was complete, the gelatinous mixture (pH=9.1) was heated for about 15 hr at 80° to 85° C. The cooled mixture was filtered, washed repeatedly with water, and dried overnight under vacuum at 70° C. The XRD of the material showed a typical hydrotalcite-type structure with d(003) value of 7.85 Å. This material corresponds to the formulation Mg$_4$Fe$_2$(OH)$_{12}$CO$_3$·4H$_2$O.

EXAMPLE 12

The material described in Example Fe-11 was calcined by placing a weighed mount of the material in a calciner and raising the temperature at 20° C./min until a temperature of 450° to 500° C. was reached. The material was kept at that temperature for about 15 hr and then sieved to different mesh sizes. This sized material was further calcined at 850° C. The resulting material corresponded to the formulation Mg$_4$Fe$_2$O$_7$.

EXAMPLE 13

A 1 L, 3-neck round bottom flask equipped with a thermometer, reflux condenser, and mechanical stirrer was charged with 400 mL deionized water, 20.87 g (0.3375 mol) of H$_3$BO$_3$, and 25.54 g (0.6375 mol) of NaOH pellets. A second solution containing 30.3 g (0.075 mol) of Fe(NO$_3$)$_3$·9H$_2$O, 38.46 g (0.15 mol) of Mg(NO$_3$)$_2$·6H$_2$O and 375 mL of water was prepared and added dropwise to the first solution while stirring for a period of about 1 hr. After addition was complete, the gelatinous mixture (pH=9.1) was heated for about 15 hr at 80° to 85° C. The cooled mixture was filtered, washed repeatedly with water, and dried overnight under vacuum at 70° C. The XRD of the material showed a typical hydrotalcite-type structure with d(003) value of 8.8 Å. This material corresponds to the formulation Mg$_4$ Fe$_2$(OH)$_{12}$(B$_3$O$_3$(OH)$_4$)$_2$·2H$_2$O.

EXAMPLE 14

The material described in Example 13 was calcined by placing a weighed mount of the material in a calciner and raising the temperature at 20° C./min until a temperature of 450° to 500° C. was reached. The material was kept at that temperature for about 15 hr and then sieved to different mesh sizes. This sized material was further calcined at 850° C. The resulting material corresponded to the formulation Mg$_4$Fe$_2$B$_6$O$_{16}$.

EXAMPLE 15

A 1 L, 3-neck round bottom flask equipped with a thermometer, reflux condenser, and mechanical stirrer was charged with 400 mL deionized water, 7.95 g (0.075 mol) of NaCO$_3$, and 18.0 g (0.45 mol) of NaOH pellets. A second solution containing. 3.62 g (0.15 mol) of Ni(NO$_3$)$_2$·6H$_2$O and 28.13 g (0.075 mol) of Al(NO$_3$)$_3$·9H$_2$O, and 375 mL of water was prepared and added dropwise to the first solution while stirring for a period of about 1 hour. After addition was complete, the gelatinous mixture was heated for about 15 hr at 80° to 85° C. The cooled mixture was then filtered, washed repeatedly with water, and dried overnight under vacuum at 70° C. The XRD of the material shows typical hydrotalcite-type structure with d(001) value of 7.6 angstroms. This material corresponds to the formulation [Ni$_4$Al$_2$(OH)$_{12}$]CO$_3$·4H$_2$O.

EXAMPLE 16

The material described in Example 15 was calcined by placing a weighed mount of the material in a calciner and raising the temperature at 20° C./min. until a temperature of 450° to 500° C. was reached. The material was kept at that temperature for about 15 hours and then sieved to 12–20 mesh. The XRD pattern of this material shows that the bulk of the material is amorphous and only some weak peaks due to NiO. Further calcination of this material up to a temperature of about 850° C. did not change the nature of this material as evident from the XRD.

Certain embodiments of the present invention have been set forth in the preceding description of the invention. However, alternate embodiments and various modifications will be apparent to those skilled in the art. These alternatives and modifications are considered to be equivalent and within the spirit and scope of the present invention.

Having described the invention, that which is claimed is:

1. A process for partial oxidation of at least one hydrocarbyl compound with a source of oxygen which comprises the steps of (A) feeding one or more gaseous or vaporizable hydrocarbyl compounds and an oxygen-containing gas comprising molecular oxygen, carbon dioxide, or mixtures thereof, into a suitable reaction zone containing a catalyst, (B) controlling temperatures within the reaction zone to temperatures in a range from about 400° C. to about 1400° C., (C) reacting at least one of the hydrocarbyl compounds in the presence of the catalyst to form partial oxidation products, and expelling a product-containing gas mixture from the reaction zone, and (D) recovering from the product-containing mixture a synthesis gas comprising hydrogen and carbon monoxide;

wherein the catalyst comprises a mixture formed by heat treating a hydrotalcite compound which contains rhodium and wherein heat treating comprises heating the rhodium-containing hydrotalcite compound to temperatures in a temperature range upward from about 400° C.

2. The process according to claim 1 wherein at least one of the hydrocarbyl compound is a hydrocarbon having about 1 to about 20 carbon atoms, the partial oxidation is carried out at temperatures within the reaction zone in a range from about 450° C. to about 1250° C.

3. The process according to claim 1 wherein partial oxidation of at least one compound selected from the group consisting of methane and ethane is carried out at temperatures within the reaction zone in a range from about 450° C. to about 1250° C.

4. The process according to claim 1 wherein the catalyst comprises a mixture formed by heat treating a hydrotalcite compound having formula $$[Mg^{2+}{}_4Al^{3+}{}_{2-y}Rh^{3+}{}_y(OH)_{12}]CO_3{}^{2-}\cdot mH_2O$$

where y is a number in a range from about 0.00001 to about 1.5; and m is 0 or a positive number.

5. The process according to claim 4 wherein the heat treating comprises heating the hydrotalcite compound to temperatures in a temperature range upward from about 450° C.

6. The process according to claim 4 wherein partial oxidation of at least one compound selected from the group consisting of methane and ethane is carried out at temperatures within the reaction zone in a range from about 450° C. to about 1250° C.

7. The process according to claim 1 wherein the oxygen-containing gas comprising carbon dioxide.

8. A process for partial oxidation of at least one hydrocarbyl compound with a source of oxygen which comprises the steps of (A) feeding one or more gaseous or vaporizable hydrocarbyl compounds and an oxygen-containing gas comprising molecular oxygen, carbon dioxide, or mixtures thereof, into a suitable reaction zone containing a catalyst, (B) controlling temperatures within the reaction zone to temperatures in a range from about 400° C. to about 1400° C., (C) reacting at least one of the hydrocarbyl compounds in the presence of the catalyst to form partial oxidation products, and expelling a product-containing gas mixture from the reaction zone, and (D) recovering from the product-containing mixture a synthesis gas comprising hydrogen and carbon monoxide;

wherein the catalyst comprises a mixture formed by heat treating a hydrotalcite compound having formula $$[M^{2+}{}_wAl^{3+}{}_{2-y}M^{3+}{}_y(OH)_{2(w+2)}]^{2+}(A^{n-}{}_{2/n})\cdot mH_2O$$

where $M^{2+}$ is at least one divalent metal ion selected from the group consisting of magnesium, chromium, manganese, iron, cobalt, nickel, copper, and zinc ions; $M^{3+}$ is at least one trivalent metal ion selected from the group consisting of titanium, vanadium, chromium, manganese, iron, cobalt, nickel, gallium, ruthenium, rhodium, lanthanum, cerium, praseodymium, neodymium, samarium, europium, gadolinium, terbium, dysprosium, holmium, erbium, thulium, ytterbium, lutetium, and iridium ions; w is a number in a range from about 2 to about 20; y is a number in a range from about 0.00001 to about 2; $A^{n-}$ is an anion having a negative charge of n; and m is 0 or a positive number.

9. The process according to claim 8 wherein partial oxidation of at least one compound selected from the group consisting of methane and ethane is carried out at temperatures within the reaction zone in a range from about 450° C. to about 1250° C.

10. The process according to claim 8 wherein A is carbonate.

11. The process according to claim 8 wherein $M^{3+}$ is at least one trivalent metal ion selected from the group consisting of titanium, vanadium, chromium, manganese, iron, cobalt, nickel, gallium, ruthenium, rhodium, lanthanum, and iridium ions.

12. The process according to claim 8 wherein $M^{2+}$ is at least one divalent metal ion selected from the group consisting of magnesium, nickel, and copper ions.

13. The process according to claim 12 wherein $M^{3+}$ is at least one trivalent metal ion selected from the group consisting of iron, cobalt, nickel, ruthenium, rhodium, and iridium ions.

14. The process according to claim 13 wherein partial oxidation of at least one compound selected from the group consisting of methane and ethane is carried out at temperatures within the reaction zone in a range from about 450° C. to about 1250° C.

15. A process for partial oxidation of at least one hydrocarbyl compound with a source of oxygen which comprises the steps of (A) feeding one or more gaseous or vaporizable hydrocarbyl compounds and an oxygen-containing gas comprising molecular oxygen, carbon dioxide, or mixtures thereof, into a suitable reaction zone containing a catalyst, (B) controlling temperatures within the reaction zone to temperatures in a range from about 400° C. to about 1400° C., (C) reacting at least one of the hydrocarbyl compounds in the presence of the catalyst to form partial oxidation products, and expelling a product-containing gas mixture from the reaction zone, and (D) recovering from the product-containing mixture a synthesis gas comprising hydrogen and carbon monoxide;

wherein the catalyst comprises a mixture formed by heat treating a hydrotalcite compound having formula $$[Mg^{2+}{}_4Fe^{3+}{}_2(OH)_{12}]^{2+}CO_3{}^{2-}\cdot mH_2O$$

where m is 0 or a positive number.

16. The process according to claim 15 wherein the heat treating comprises heating the hydrotalcite compound to temperatures in a temperature range upward from about 450° C.

17. The process according to claim 15 wherein partial oxidation of at least one compound selected from the group consisting of methane and ethane is carried out at temperatures within the reaction zone in a range from about 450° C. to about 1250° C.

* * * * *

UNITED STATES PATENT AND TRADEMARK OFFICE
CERTIFICATE OF CORRECTION

PATENT NO. : 5,614,163  
DATED : March 25, 1997  
INVENTOR(S) : Bhattacharyya, et al Page 1 of 4

It is certified that error appears in the above-indentified patent and that said Letters Patent is hereby corrected as shown below:

| Col. | Line | |
|---|---|---|
| 2 | 14 | "(1:1)and" should read --(1:1) and-- |
| 2 | 20 | "in all of the herein above described processes" should read --In all of the herein above described processes-- |
| 2 | 34-35 | "nickel-containing stem reforming and stem cracking catalysts," should read --nickel-containing steam reforming and steam cracking catalysts,-- |
| 3 | 46 | "alehydrogenation catalysts, etc.," should read --dehydrogenation catalysts, etc.,-- |
| 5 | 38 | "$[Mg^{2+}_4Al^{3+}_{2-y}(OH)_{12}]^{2+}CO_3^{2-} \cdot mH_2O$" should read --$[Mg^{2+}_4Al^{3+}_{2-y}Rh^{3+}_y(OH)_{12}]^{2+}CO_3^{2-} \cdot mH_2O$-- |

UNITED STATES PATENT AND TRADEMARK OFFICE
CERTIFICATE OF CORRECTION

PATENT NO. : 5,614,163
DATED : March 25, 1997
INVENTOR(S) : Bhattacharyya, et al Page 2 of 4

It is certified that error appears in the above-indentified patent and that said Letters Patent is hereby corrected as shown below:

| Col. | Line | | |
|---|---|---|---|
| 7 | 6-7 | "various mounts of oxygen" should read | --various amounts of oxygen-- |
| 8 | 13 | "metalales" should read | --metalates-- |
| 9 | 62-63 | "An antion precursor" should read | --An anion precursor-- |
| 10 | 5 | "a carbonate artion," should read | --a carbonate anion,-- |
| 11 | 45 | "high pressure stem." should read | --high pressure steam.-- |
| 11 | 67 | "it is not essential to add stem" should read | --it is not essential to add steam-- |
| 12 | 1 | "stem or water" should read | --steam or water-- |

UNITED STATES PATENT AND TRADEMARK OFFICE
CERTIFICATE OF CORRECTION

PATENT NO. : 5,614,163

DATED : March 25, 1997

INVENTOR(S) : Bhattacharyya, et al

Page 3 of 4

It is certified that error appears in the above-indentified patent and that said Letters Patent is hereby corrected as shown below:

| Col. | Line | |
|---|---|---|
| 12 | 14 | "the addition of water or stem" should read --the addition of water or steam-- |
| 12 | 15 | "The mount of stem present" should read --The amount of steam present-- |
| 12 | 18 | "the mount of water" should read --the amount of water-- |
| 13 | 62 | "a weighed mount of the material" should read --a weighed amount of the material-- |
| 14 | 12 | "(pH=8.9) Was heated" should read --(pH=8.9) was heated-- |
| 16 | 2 | "$Mg_4Rh_{0.0005}Al_{1.9995}(OH)_{12}(OH)_{12}CO_3$" should read --$Mg_4Rh_{0.0005}Al_{1.9995}(OH)_{12}CO_3$-- |
| 17 | 55 | "a weighed mount of the material" should read --a weighed amount of the material-- |
| 18 | 17 | "a weighed mount of the material" should read --a weighed amount of the material-- |

UNITED STATES PATENT AND TRADEMARK OFFICE
CERTIFICATE OF CORRECTION

PATENT NO. : 5,614,163
DATED : March 25, 1997
INVENTOR(S) : Bhattacharyya, et al It is certified that error appears in the above-indentified patent and that said Letters Patent is hereby corrected as shown below:

| Col. | Line | |
|------|------|---|
| 18 | 31 | "3.62 g" should read --43.62 g-- |
| 18 | 46 | "a weighed mount of the material" should read --a weighed amount of the material-- |
| 19 | 32 | "$[Mg^{2+}_4Al^{3+}_{2-y}Rh^{3+}_y(OH)_{12}]CO_3^{2-}\cdot mH_2O$" should read --$[Mg^{2+}_4Al^{3+}_{2-y}Rh^{3+}_y(OH)_{12}]^{2+}CO_3^{2-}\cdot mH_2O$-- |

Signed and Sealed this

Nineteenth Day of August, 1997

Attest:

BRUCE LEHMAN

*Attesting Officer*    Commissioner of Patents and Trademarks